United States Patent
Gapontsev et al.

(10) Patent No.: US 8,830,564 B2
(45) Date of Patent: Sep. 9, 2014

(54) APPARATUS FOR CONTROLLING RESONANT CONDITIONS WITHIN NONLINEAR RESONATOR

(75) Inventors: Valentin P. Gapontsev, Worcester, MA (US); Yuri Grapov, Sutton, MA (US); Mark Warren, Worcester, MA (US)

(73) Assignee: IPG Photonics Corporation, Oxford, MA (US)

( * ) Notice: Subject to any disclaimer, the term of this patent is extended or adjusted under 35 U.S.C. 154(b) by 1344 days.

(21) Appl. No.: 12/321,685

(22) Filed: Jan. 23, 2009

(65) Prior Publication Data

US 2014/0139905 A1    May 22, 2014

(51) Int. Cl.
G02F 1/35    (2006.01)
H01S 3/10    (2006.01)
H01S 3/00    (2006.01)

(52) U.S. Cl.
CPC ............. *H01S 3/0092* (2013.01); *G02F 1/35* (2013.01)
USPC ............................................ 359/328; 372/21

(58) Field of Classification Search
USPC ............................................. 359/328; 372/21
See application file for complete search history.

(56) References Cited

U.S. PATENT DOCUMENTS

| | | | |
|---|---|---|---|
| 5,422,897 A | 6/1995 | Wyatt et al. | |
| 6,763,042 B2 | 7/2004 | Williams | |
| 2008/0240176 A1* | 10/2008 | Masuda | 372/21 |
| 2011/0058248 A1* | 3/2011 | Vodopyanov et al. | 359/330 |

* cited by examiner

*Primary Examiner* — Hemang Sanghavi
(74) *Attorney, Agent, or Firm* — Yuri Kateshov, Esq.; Timothy J. King, Esq.

(57) ABSTRACT

A fiber laser system is configured with a nonlinear resonator cavity which includes a plurality of mirrors. One of the mirrors is a piezoelectric mirror capable of being displaced between multiple positions in response to a control signal generated by a digital controller. The generation of the control signal is caused by mismatch between a fundamental frequency, imputed into the resonant cavity and further split by a nonlinear crystal into resonant and harmonic frequencies, and the resonant frequency. The positions of the piezoelectric mirror and time interval the piezoelectric mirror may occupy these position are controlled so that the output radiation at the harmonic may be periodically interrupted which results in a pulsed output radiation.

15 Claims, 3 Drawing Sheets

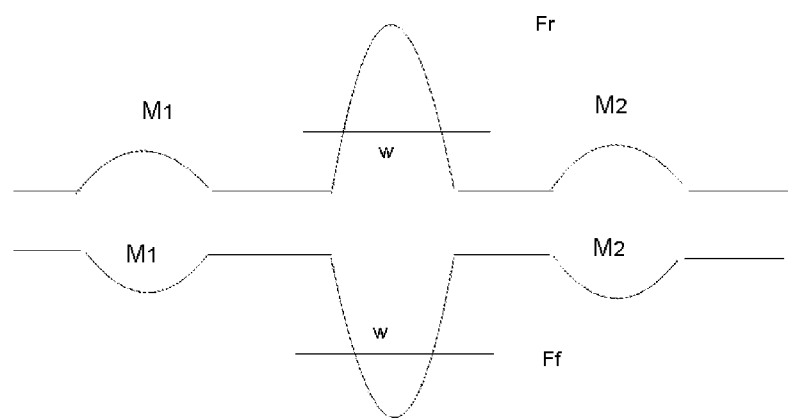
FIG. 3

APPARATUS FOR CONTROLLING RESONANT CONDITIONS WITHIN NONLINEAR RESONATOR

BACKGROUND OF THE DISCLOSURE

1. Field of the Disclosure

The present disclosure relates generally to frequency conversion of laser light from fiber lasers. More particularly, the disclosure relates to an apparatus for controlling lasing condition within a ring resonator provided with a piezoelectric mirror.

2. The Prior Art

A fiber laser provided with a second harmonic generation component and operative to provide the available frequency range, uniform output intensity, and high conversion efficiency is disclosed in U.S. Pat. No. 6,763,042 ("U.S. '042"), fully incorporated herein by reference. As shown in FIG. 1, a pump radiation 22 incident upon an input or pump mirror 34 of a ring resonator 14 leaks into the cavity. The leaked pumped radiation propagates along a light path within the cavity at a fundamental frequency and eventually impinges upon a piezoelectric mirror 36 having an actuator 40. The reflected pump radiation is further incident upon a first curved mirror 38 which reflects the pump light through a nonlinear crystal 30. Upon exiting the crystal, 90% of the leaked light are converted into an output light 32 which propagates through an output curved mirror 28 at a harmonic frequency and light at a resonant frequency remaining within the cavity. The light at the resonant frequency is reflected from mirror 34 and evaluated by a control circuitry 42. The control circuitry 42 is operative to evaluate the resonant frequency and compare it to a reference value. If the comparison is unsatisfactory, i.e. the resonant frequency is different from the fundamental frequency, a control signal is generated to shift piezoelectric mirror 36 so as to control a light path within the cavity until the resonant frequency and the frequency of the pump radiation are matched but are in antiphase.

The control circuitry disclosed in U.S. '042 is analog. The analog circuitry has a long reaction time and bulky. Furthermore, it is packaged with the rest of the laser system adding additional logistic problems.

Although a pump having a master oscillator power amplifier configuration operates in a continuous wave regime, many industrial applications including welding, cutting, tissue treatment and others require rather a quasi pulsed configuration. In other words, the output radiation should be interrupted. However, the control circuitry disclosed in the above-mentioned patent appears to not provide such a feature.

A need therefore exists for an improved fiber laser of the aforementioned type having a stand-alone controller.

A further need exists for a digitally operating controller.

Still a further need exists for controllably regulating the output of the fiber laser.

SUMMARY OF THE DISCLOSURE

These need are satisfy by the apparatus configured in accordance with the present disclosure.

According tone aspect of the disclosure, the disclosed apparatus includes a fiber laser radiation source generating a radiation at a fundamental frequency. The radiation propagates towards a resonator provided with a plurality of mirrors defining a light path within the resonator. On of the mirrors is configured to bleed a portion of the radiation at the fundamental frequency into the cavity and reflect the remaining portion.

Located within the cavity along the light path is a nonlinear crystal receiving the portion of the radiation at the fundamental frequency and configured split it at a resonant and harmonic frequencies differing from one another. The radiation at the resonant frequency propagates along the light path and impinges upon the one mirror which again bleeds a small portion of the incident radiation while reflecting the other portion back into the cavity.

The reflected portion of the radiation at the fundamental frequency and the bled portion of the radiation at the resonant frequency are matched in a digital controller and a control signal is outputted by the controller if there is no match.

The control signal is coupled into one of the mirrors—piezoelectric mirror—which is operative to move so as to vary the length of the light path. Thus, the piezoelectric mirror is displaced to the desired position in which the length of the light path is such that the fundamental and resonant frequencies are matched which unlocks the cavity and lets the radiation at the fundamental into the cavity.

In accordance with a further aspect of the disclosure, the apparatus is operative to control the interruption of the output radiation, providing thereby a pulsed output. I particular, the apparatus has a radiation source generating a continuous radiation at a fundamental frequency which is partly coupled into a resonant cavity and partly reflected. The transmitted portion of the radiation at the fundamental frequency propagates along a light path within the cavity and is coupled into a nonlinear crystal which is configured to split the received radiation into the radiation with different resonant and harmonica frequency.

The radiation at the harmonic frequency is outputted and control by a controller which displaces one of the mirrors defining the light path for a predetermined period of time to such a position in which the radiation at the harmonic frequency is interrupted. The controllable pulsed output at the desired harmonic frequency can be utilized in a variety of the industries including cutting, welding and others.

BRIEF DESCRIPTION OF THE DRAWINGS

The above and other aspects of the disclosure will become more readily apparent from the fallowing specific description better understood in conjunction with the drawings, in which:

FIG. 3 is an illustrative representation of the operation of the disclosed apparatus.

SPECIFIC DESCRIPTION

Figure 2:
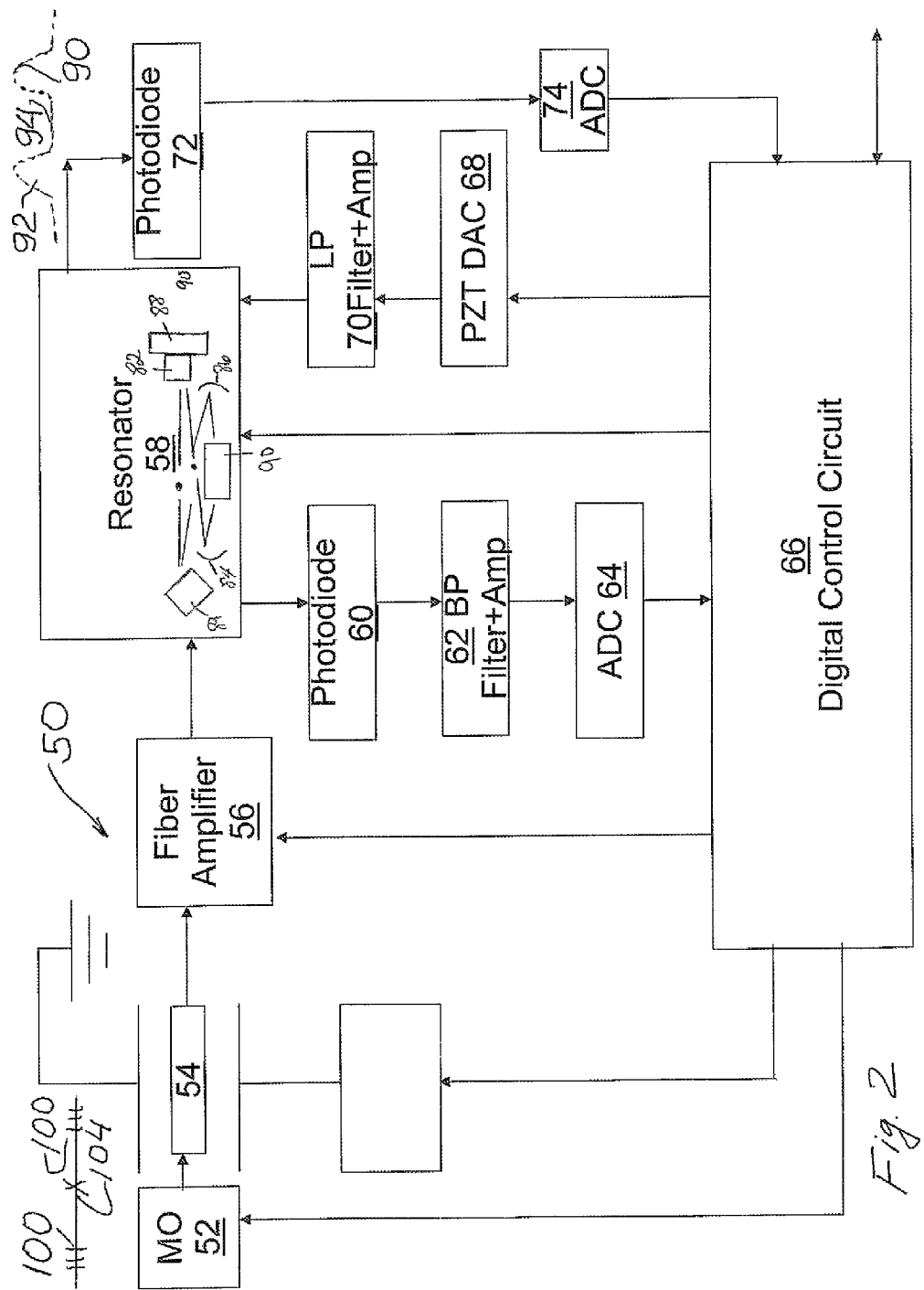
FIG. 2 is an block diagram of the device configured in accordance with the present disclosure.

Referring to FIG. 2, the disclosed device is configured to provide a reliable control of a mode frequency conversion system 50. The system 50 is configured with a power source shaving a master oscillator 52 and a fiber amplifier 56 operative to emit a pump radiation at a fundamental frequency Ff.

Figure 1:
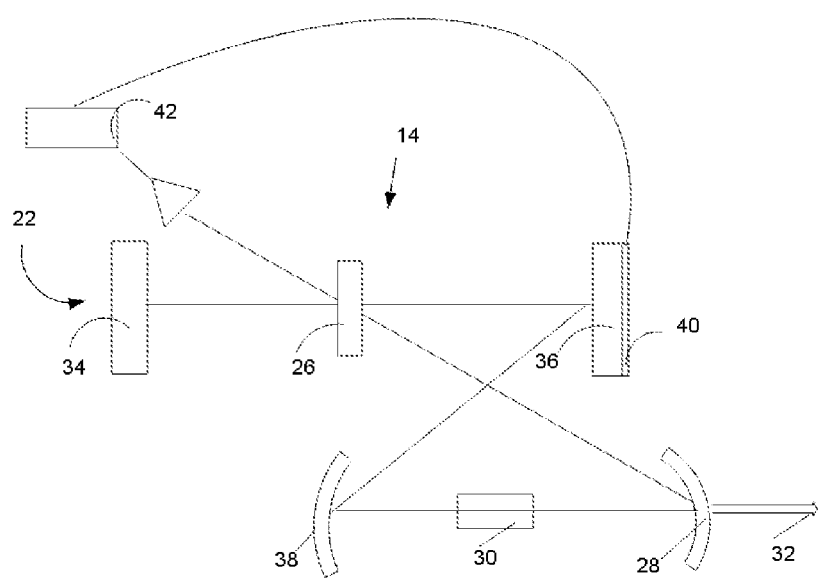
FIG. 1 is a diagrammatic representation of an apparatus configured in accordance with the prior art.

The pump radiation propagates towards and is incident upon a resonator 58. The resonator is configured similarly to the configuration of FIG. 1 and, thus, includes a pump mirror 80, piezoelectric mirror 82, a pair of mirrors 84 and 86, respectively, and a nonlinear crystal 90 coupled between mirrors 84 and 86.

The mirror 80 further referred as pump mirror is configured to partially transmit a small portion of the pump radiation at the fundamental frequency and reflect the remaining part of the pump radiation. The transmitted small portion of the pump radiation is coupled into resonator 58 and propagates along the light path first towards piezoelectric mirror 82, then to first mirror 84 and is coupled in to a second harmonic generation nonlinear crystal 90. The crystal 90 is configured to split the pump radiation into the output radiation at the harmonic frequency and the radiation at the resonant frequency Fr which continuous to propagate along the light path toward pump mirror 80. The pump mirror 80 allows a small portion the circulating radiation at the resonant frequency Fr to leak, while the remaining portion remains within the cavity.

The reflected remaining portion of the pump radiation at the fundamental frequency Ff and the leaked portion of the radiation at the resonant frequency are guided along a server loop of a digital controller 64 and eventually received by the latter. The controller 66 has software operable to process the received portions of the radiation and compare the resonant and fundamental frequencies. If the frequencies match, the resonant cavity 58 is open and the pump light continues to enter while the radiation at the resonant frequency is allowed to exit.

Referring to FIG. 3, only when the frequencies Fr and Ff match and are in antiphase, the radiation at the harmonic Fh is outputted by system 50. As readily realized by one of ordinary skills, the fundamental frequency is extremely high which makes its detection practically impossible. Accordingly, the fundamental frequency is modulated by another nonlinear crystal 54. Similarly, the resonant frequency is similarly modulated. In graphical terms, marks M1 and M2 define a region which can be detected and as a consequence the position of the peaks of the frequencies relative one another can be detected, as readily explained in U.S. Pat. No. 6,763,042.

Once the mismatch between the frequencies is detected, controller 66 generates a first control signal processed by a digital analog converter 68, filtered and amplified in LP filter/amplifier and received by an actuator 88 (FIG. 2) coupled to piezoelectric mirror 82. The actuator is operative to displace PZ mirror 88 to a position altering the light path so that the fundamental and resonant frequencies match.

In accordance with a further aspect of the disclosure, the output radiation at the harmonic frequency Fh can be shaped so that instead of a continuous output, system 50 will have a pulsed output 90. Since PZ mirror 82 may move to a position in which the resonator cavity 82 is locked, no output radiation will be observe if the PZT mirror 82 is controllably occupies this position. Accordingly, the controller 66 may be operative to generate a control signal received by actuator 88 which thus will move PZT 82 from the position where the resonant cavity 58 is open, which correspond to peaks 92 t the position where the cavity is locked. The laster state corresponds to valleys 94. As a consequence the desired repetition rate, pulse width and other characteristics can be controllably maintained.

As can be seen, the power of the output radiation can be controlled as weel in response to receiving a signal from photodiode 72 and an analog-digital converter which corresponds to the power level of the output radiation. Upon comparison with a reference value stored in controller 66, the latter generates anther control signal correcting the output of the fiber amplifier 56. The assembly including the resonator, controller, photodiodes 60, band patss filter 62, analog-digital converter 64, digital-analog conveter 68, low pass filter 70, photodiode 72 and analog-digital converter 74 is packages as a stand alone unit.

Turning to the power source including master oscillator 52 and fiber amplifier 56, oscillator 52 may be configured with an optical cavity defined between a pair of spaced reflectors 100 and include a multimode fiber 102 generating the radiation at the SM fundamental frequency and a single mode fiber 104 lasing the radiation at the fundamental frequency. The multimode and single mode fibers 102, 104, respectively, are directly coupled to one another in an end-to-end arrangement and configured so that only the fundamental mode supported by the multimode fiber at the fundamental frequency couples into the single mode fiber 104, which happens practically without power losses.

It will be apparent to those skilled in the art that various modifications and variations can be made to the disclosed apparatus without departing from the scope of the disclosure as recited by the following claims.

The invention claimed is:

1. An apparatus for controlling a fiber laser device, comprising:
 a radiation source generating a radiation at a fundamental frequency; and
 a resonator receiving a portion of the radiation at the fundamental frequency and configured so that the portion of the radiation is split at a resonant and harmonic frequencies differing from one another;
 a light guiding unit mounted within and defining a light path within the resonator, the light guiding unit having a piezoelectric mirror operative to move so as to vary a length of the light path; and
 a digital controller receiving the portion of the radiation at the fundamental and resonant frequencies and operative to compare the received frequencies so as to generate a control signal displacing the piezoelectric mirror to vary the light path until the fundamental and resonant frequencies are substantially the same.

2. The apparatus of claim 1, wherein the radiation source includes a master oscillator and a fiber power amplifier, the master oscillator having an optical cavity defined between a pair of spaced reflectors, the cavity including a multimode fiber generating the radiation at the fundamental frequency different from a pump frequency, and a single mode fiber lasing the radiation at the fundamental frequency, the multimode and single mode fibers being directly coupled to one another in an end-to-end arrangement and configured so that only the fundamental frequency of the multimode fiber at the fundamental frequency couples into the single mode fiber without substantial losses.

3. The apparatus of claim 2, wherein the resonator is configured with a harmonic generation unit receiving the radiation at the fundamental frequency from the power amplifier and operative to split the radiation at the fundamental frequencies into the radiation at the resonant and harmonic frequencies.

4. The apparatus of claim 3, wherein the light guiding unit is configured with a pump mirror aligned with the piezoelectric mirror and operatively coupled to the controller, a first mirror spaced diagonally from the piezoelectric mirror and an output mirror aligned with the first mirror.

5. The apparatus of claim 4, wherein the harmonic generation unit is coupled between the first and second mirrors, the second mirror being configured to reflect the radiation at the resonant frequency along the light path within the resonator and to output the radiation at the harmonic frequency out of the resonator.

6. The apparatus of claim 5, wherein the pump mirror is configured to couple the portion of the radiation at the fundamental frequency into the resonator along the light path while reflecting a remaining portion of the radiation at the fundamental frequency from the resonator towards the controller, and to bleed a portion of the radiation at the resonant frequency reflected from the second mirror towards the controller, the pump, piezoelectric, first and second mirrors being arranged in a bow tie configuration.

7. The apparatus of claim 6 further comprising an analog-digital converter operative to digitize the remaining portion of the radiation at the fundamental frequency and the portion of the radiation at the resonant frequency, the analog-digital converter being coupled to the controller.

8. The apparatus of claim 7, wherein the controller is operative to provide comparison between the digitized portions of the radiation at respective fundamental and resonant frequencies and generate a first control signal if the fundamental and resonant frequencies do not match, the first control signal being coupled into the piezoelectric mirror.

9. The apparatus of claim 8 further comprising an actuator operative to controllably displace the piezoelectric mirror in response to the first control signal so as to adjust the length of the light path in the resonator so that the digitized portions of the radiation at respective fundamental and resonant frequencies match one another.

10. The apparatus of claim 5, wherein the output radiation at the harmonic frequency is incident upon a sensor operative to generate a signal corresponding to a power of the output radiation, the sensor being coupled to the controller operative to match the measure signal with a reference value and output a second control signal if the match is not detected, the second control signal being coupled to the fiber laser amplifier operative to vary an amplification power until the power of the output radiation matches the reference value.

11. An apparatus for controlling a fiber laser device, comprising:
   a radiation source generating a radiation at a fundamental frequency; and
   a resonator receiving a portion of the radiation at the fundamental frequency and configured so that the fundamental frequency of the portion of the radiation is split at a resonant and harmonic frequencies differing from one another;
   a light guiding unit configured to output the radiation at the harmonic frequency and defining a light path of the radiation at the resonant frequency within the resonator, the light guiding unit having a displaceable piezoelectric mirror; and
   a digital controller coupled to the resonator so as to interrupt the output radiation at the harmonic frequency at a predetermined period of time by displacing the piezoelectric mirror to a predetermined position.

12. The apparatus of claim 11, wherein the radiation source includes a master oscillator and a fiber power amplifier, the master oscillator having an optical cavity defined between a pair of spaced reflectors, the cavity including a multimode fiber generating the radiation at the fundamental frequency different from a pump frequency, and a single mode fiber lasing the radiation at the fundamental frequency, the multimode and single mode fibers being directly coupled to one another in an end-to-end arrangement and configured so that only the fundamental frequency of the multimode fiber at the fundamental frequency couples into the single mode fiber without substantial losses.

13. The apparatus of claim 11, wherein the light guiding unit is configured with additional three mirrors defining with the piezoelectric mirror the light path, one of the mirrors being configured
   to transmit the portion of the radiation at the fundamental frequency into the resonator along the light path and reflect a remaining portion of the radiation at the fundamental frequency, and
   to bleed a portion of the radiation at the resonant frequency outside the resonator, the portion of the radiation at the fundamental frequency and the portion of the radiation at the resonant frequency being coupled into the digital controller.

14. The apparatus of claim 12, wherein the resonator is configured with a harmonic generation unit located along the light path so as to split the radiation at the fundamental frequency received from the power amplifier into the radiation at the resonant and harmonic frequencies.

15. The apparatus of claim 13, wherein the controller is operative to receive a signal representing power of the output radiation at the harmonic frequency and match the signal with a reference value, the controller outputting a control signal to the source of radiation to vary intensity of the radiation at the fundamental frequency until the match between the signal and reference value is detected.

* * * * *